June 26, 1923.
F. W. MANNING
FILTER
Original Filed Sept. 18, 1919
1,459,836
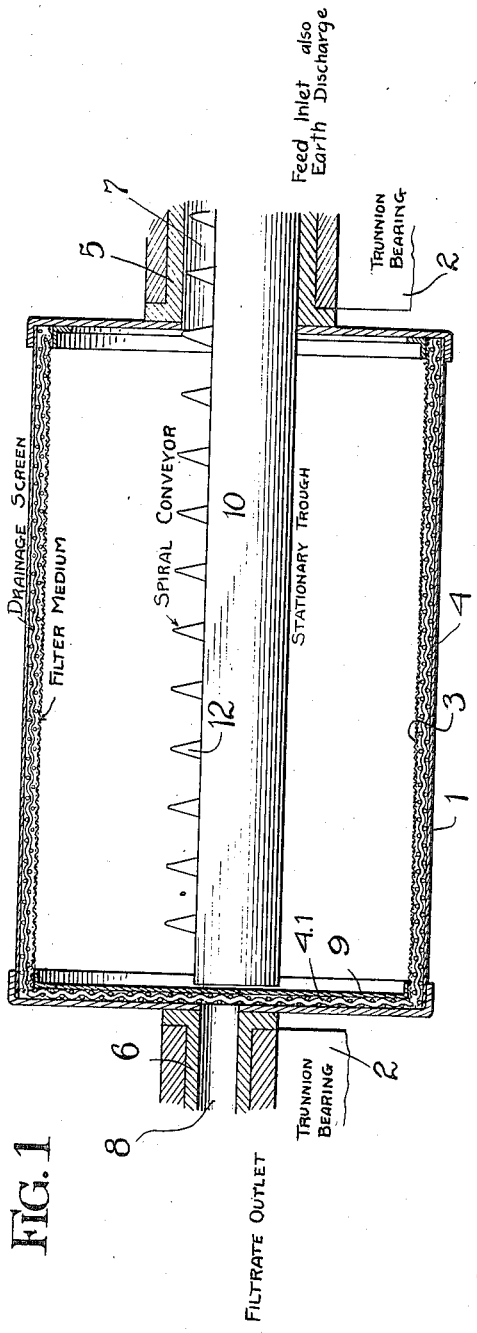
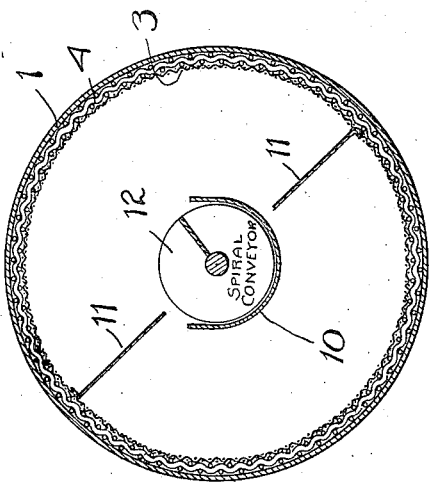
Fig. 1
Fig. 2
Inventor
F. W. Manning
By Rummler & Rummler
Attys Patented June 26, 1923.

1,459,836

UNITED STATES PATENT OFFICE.

FRED W. MANNING, OF BROOKLYN, NEW YORK.

FILTER.

Application filed September 18, 1919, Serial No. 324,507. Renewed November 6, 1922. Serial No. 599,442.

*To all whom it may concern:*

Be it known that I, FRED W. MANNING, a subject of the King of Great Britain, and a resident of Brooklyn, county of Kings and State of New York, have invented certain new and useful Improvements in Filters, of which the following is a specification.

This invention relates to the filtration of liquids for the purpose of removing therefrom any solid substances or particles carried in suspension or contained therein.

Heretofore, various forms of filters have been used for the foregoing purpose, but they have been unavailable for use where very heavy solids were to be filtered out of liquids. The reason for this is that, because of the quick settling action of heavy, coarse solids, considerable difficulty is encountered in obtaining an even distribution of the solids over the filter medium. In some cases, the solids are so heavy and coarse that it is absolutely impossible to prevent settling thereof in the bottom of the filter without any portion being held on the filter medium.

The main objects of this invention, therefore, are to provide an improved construction and arrangement of a filter for use in separating from liquids any solid substances contained therein, which will permit the use of high pressures whereby to make possible in a practical way the filtration of liquids containing heavy solid substances, and also to facilitate the filtration of liquids which contain lighter solids; to provide improved means for insuring a uniform filtering action so that the substances extracted from the liquid are evenly distributed over the filter medium; and to provide improved means for removing from the filter the solid substances extracted from the liquid.

A specific embodiment of this invention has been diagrammatically illustrated in the drawings, in which—

Fig. 1 shows a longitudinal sectional elevation of a filter constructed in accordance with this invention.

Fig. 2 is a transverse sectional elevation of the same.

In the specific embodiment herein shown, the filter comprises a cylindrical member or drum 1 rotatably mounted upon a bearing 2 and having a filter medium 3 arranged upon the inner periphery of said member or drum and spaced away therefrom by a drainage screen 4. Combined with this is a trough 10 and conveyor 12 whereby the substances extracted from the liquids are removed from the filter.

The cylindrical member or drum 1 is preferably of a steel construction so built that it will withstand comparatively high pressures, as for instance 150 to 200 pounds per square inch of surface. To the ends of the drum are secured trunnions 5 and 6 which are journaled in bearings 2 and in which are formed axially disposed openings 7 and 8 respectively. The opening 7 is both inlet for the liquid to be filtered, and outlet for the substances extracted from the liquid, as will more fully hereinafter appear.

The filter medium 3 may be of any suitable construction which will have the desired effect in extracting from liquid the solid substances or particles carried in suspension. Preferably, a very fine-woven wire screen is used. The drainage screen 4 is preferably a coarse wire construction, although other means could be used for spacing the filter medium away from the periphery of the cylinder. It is of course essential that it be of sufficient strength to withstand the pressure against the filter medium. A plate 9 is shown secured at one end of the drum and spaced away therefrom by a continuation 4.1 of the drainage screen 4, so as to provide communication between the drainage screen 4 and the outlet passage 8 in the trunnion 6, from which the filtrate is conducted to a suitable receptacle.

Suitable mechanism, not shown, is provided for rotating the cylindrical member 1 at whatever speed may be found most desirable to insure the proper distribution over the filter medium of the substances extracted from the liquid, by preventing said substances from settling to and collecting at the bottom of the cylindrical member as would occur if the member 1 were to remain stationary.

A pump or other suitable pressure means is connected to the opening 7 and with a source of supply of liquid to be filtered, and forces said liquid into the drum, first filling the same and then producing and maintaining a comparatively high pressure on the liquid as said drum rotates. If liquids of low viscosity are treated, the filtering process is very rapid, and if liquids of high viscosity are treated, the action is sufficiently rapid to make the filtration of such liquids a practical matter.

Means providing for the removal from the cylindrical member 1, of the substances extracted from the liquid, are herein shown in the form of the trough 10 and the conveyer 12, extending into the member 1 through the opening 7 and concentrically arranged relative to said member. The extracted substances are delivered to the trough by means of vanes 11 and discharged from the outer end of the trough by the conveyer 12. The vanes 11 are rigidly secured in a suitable manner and number to the drum 1 and extend throughout the entire length thereof in radially disposed relation. When the pressure is relieved in the drum after the filtering process has been carried as far as possible, the extracted substances fall to the bottom of the drum, from whence they are carried by the vanes and discharged into the trough.

Suitable means (not shown) are connected to rotate the spiral conveyer 12 so as to carry such substances along the trough and out to the discharge end thereof.

The operation of the device herein shown is substantially as follows:

The liquid to be filtered is pumped in through the opening 7 as the cylinder 1 revolves. During the rotation of the cylinder, the pressure causes the liquid to percolate through the filter medium 3 and such sediment as may collect thereon during the filtering operation. The filtrate is forced through the drainage screen 4 out through the opening 6. This action continues until a cake of sediment has collected around the filter medium to such an extent that it becomes necessary to remove the same, in order to make the operation efficient.

The removing of the sediment or solid substance removed from the liquid is accomplished by first relieving the pressure and discontinuing the supply of liquid. Upon the supply of liquid being discontinued, the excess liquid contained in the cylinder 1 is either filtered or returned to the source of supply by means of air pressure, immediately after which, the pressure being relieved, the cake of seriment falls to the bottom of the cylindrical member 1, and as the rotation is continued, is picked up by the vanes 11 and carried around until it slides off into the trough 10, from whence it is discharged by the conveyer 12.

Although but one specific embodiment of this invention has been herein shown and described, it will be understood that numerous details of the construction shown may be altered or omitted without departing from the spirit of this invention as defined by the following claims.

I claim:

1. A pressure filter comprising a closed rotary drum, a drainage element extending over and in contact with the inner periphery of said drum, a filtering medium in contact with the inner surface of said drainage element and supported thereby against outward pressure, said drainage element being adapted to permit the longitudinal flow of filtrate between said filtering medium and the inner surface of said drum, and a filtrate outlet communicating with the said drainage element.

2. A filter, comprising the combination of a hollow cylindrical shell, end members closing said shell, a sludge inlet in one of said end members, a filtrate outlet in the other of said end members, filtering means within said shell, and a conveyor for removing through said sludge inlet the solids filtered from the sludge.

3. A filter, comprising the combination of a hollow cylindrical shell, end members closing said shell, a sludge inlet in one of said end members, a filtrate outlet in the other of said end members, filtering means within said shell, means for rotating said shell, a trough extending longitudinally within said shell and through said sludge inlet, means for delivering to said trough the solids filtered from the sludge, and a conveyor for discharging said solids from said trough.

4. In a filter, an imperforate rotary drum adapted to receive the material to be filtered under pressure, a filtering medium within the drum spaced away from the inner surface thereof by a drainage element which supports said filtering medium against the pressure in the drum, end members secured to the drum, a sludge inlet in one of said end members, a filtrate outlet communicating with said drainage element and a conveyor for removing the solids filtered from the sludge through one of said end members.

5. In a filter, an imperforate rotary drum adapted to receive the material to be filtered under pressure, a filtering medium within the drum spaced away from the inner surface thereof by a drainage element which supports said filtering medium against the pressure in the drum, end members secured to the drum, a sludge inlet in one of said end members, a filtrate outlet communicating with said drainage element and a conveyor for removing the solids filtered from the sludge and means for carrying the solids to the conveyor as the drum rotates.

6. In a filter, an imperforate rotary drum adapted to receive the material to be filtered under pressure, a filtering medium within the drum spaced away from the inner surface thereof by a drainage element which supports said filtering medium against the pressure in the drum, end members secured to the drum, an axial sludge inlet in one of said end members and an axial filtrate outlet in the other end member, a conveyor for removing the solids filtered from the sludge and vanes for directing the solids from the peripheral surface of the filtering medium to said conveyor as the drum rotates.

7. In a filter an imperforate drum, having members closing the ends thereof, filtering means within the drum, trunnions secured to said end members, said trunnions being of tubular formation and forming respectively a sludge inlet and a filtrate outlet and a conveyor for discharging solids filtered from the sludge through one of the tubular trunnions.

8. In a filter an imperforate drum, having members closing the ends thereof, filtering means within the drum, trunions secured to said end members, said trunnions being of tubular formation and forming respectively a sludge inlet and a filtrate outlet and a conveyor for discharging solids filtered from the sludge through one of the tubular trunnions and vanes for discharging the solids to said conveyor as the drum rotates.

9. A rotary pressure filter including in combination, a hollow cylindrical shell, a filtering means in juxtaposition to the inner surface of said shell, a drainage element between the shell and said filtering means adapted to support the latter against the pressure within the shell, end members secured to the shell, a sludge inlet in one of said end members and a filtrate outlet in the other of said end members, a trough extending longitudinally within said shell and through said sludge inlet, means for delivering to said trough the solids filtered from the sludge and a conveyor for discharging said solids from said trough.

10. A rotary pressure filter comprising a hollow cylindrical shell having end members secured thereto, hollow trunnions secured to said end members and forming respectively a sludge inlet and a filtrate outlet, drainage elements engaging respectively the inner peripheral surface of the shell and the inner surface of the end member adjacent the filtrate outlet, filtering means supported by the drainage element which engages the shell and a plate engaging the drainage element adjacent said filtrate outlet, said plate and one of said end members forming an end filtrate passage which communicates with the space between the peripheral filtering means and the filtrate outlet.

11. A rotary pressure filter comprising a hollow cylindrical shell having end members secured thereto, hollow trunnions secured to said end members and forming respectively a sludge inlet and a filtrate outlet, drainage elements engaging respectively the inner peripheral surface of the shell and the inner surface of the end member adjacent the filtrate outlet, filtering means supported by the drainage element which engages the shell and a plate engaging the drainage element adjacent said filtrate outlet, said plate and one of said end members forming an end filtrate passage which communicates with the space between the peripheral filtering means and the filtrate outlet and a conveyor for removing through one of said hollow trunnions the solids filtered from the sludge.

Signed at Chicago this 11th day of September, 1919.

FRED W. MANNING.